(12) United States Patent
Katzenbeisser et al.

(10) Patent No.: US 8,726,029 B2
(45) Date of Patent: May 13, 2014

(54) CRYPTOGRAPHIC PROCESSING OF CONTENT

(75) Inventors: Stefan Katzenbeisser, Eindhoven (NL); Wilhelmus P. A. J. Michiels, Eindhoven (NL); Paulus M. H. M. A. Gorissen, Eindhoven (NL); Aweke N. Lemma, Eindhoven (NL); Mehmet U. Celik, Eindhoven (NL)

(73) Assignee: Irdeto Corporate B.V., Hoofddorp (NL)

( * ) Notice: Subject to any disclaimer, the term of this patent is extended or adjusted under 35 U.S.C. 154(b) by 306 days.

(21) Appl. No.: 12/677,722

(22) PCT Filed: Sep. 4, 2008

(86) PCT No.: PCT/IB2008/053588
§ 371 (c)(1),
(2), (4) Date: Aug. 10, 2010

(87) PCT Pub. No.: WO2009/034504
PCT Pub. Date: Mar. 19, 2009

(65) Prior Publication Data
US 2010/0296649 A1 Nov. 25, 2010

(30) Foreign Application Priority Data
Sep. 13, 2007 (EP) .................................. 07116285

(51) Int. Cl.
*H04L 9/28* (2006.01)
*G06F 21/10* (2013.01)
*H04L 9/00* (2006.01)
*H04L 9/06* (2006.01)

(52) U.S. Cl.
CPC ............... *G06F 21/10* (2013.01); *H04L 9/002* (2013.01); *H04L 9/0618* (2013.01); *G06F 2221/0733* (2013.01)
USPC .......................................................... 713/176

(58) Field of Classification Search
CPC ............................ H04L 9/3247; H04L 9/3281
See application file for complete search history.

(56) References Cited

U.S. PATENT DOCUMENTS

| 7,970,129 B2 * | 6/2011 | Trichina .......................... 380/28 |
| 2005/0021966 A1 * | 1/2005 | Chow et al. .................... 713/176 |

(Continued)

FOREIGN PATENT DOCUMENTS

| WO | WO-02/101519 A2 | 12/2002 |
| WO | WO 2007105126 A2 * | 9/2007 |

OTHER PUBLICATIONS

"International Application Serial No. PCT/IB2008/053588, International Search Report", (Apr. 14, 2009), 3 pgs.

(Continued)

*Primary Examiner* — Jeffrey Pwu
*Assistant Examiner* — Carlos Amorin
(74) *Attorney, Agent, or Firm* — Marc S. Kaufman; Reed Smith LLP

(57) ABSTRACT

A system for cryptographic processing of content comprises an input for receiving the content. A plurality of look-up tables represents a white-box implementation of a combined cryptographic and watermarking operation. The look-up tables represent processing steps of the combined cryptographic and watermarking operation and the look-up tables being arranged for being applied according to a predetermined look-up scheme. The look-up scheme prescribes that an output of a first look-up table of the plurality of look-up tables be used to generate an input of a second look-up table of the plurality of look-up tables. The combined cryptographic and watermarking operation comprises a cryptographic operation and a watermarking operation. A control module looks up values in the plurality of look-up tables in dependence on the received content and in accordance to the look-up scheme, thereby applying the combined cryptographic and watermarking operation to the content.

22 Claims, 5 Drawing Sheets

(56) References Cited

U.S. PATENT DOCUMENTS

| | | | |
|---|---|---|---|
| 2005/0021989 A1* | 1/2005 | Johnson et al. | 713/194 |
| 2006/0083403 A1* | 4/2006 | Zhang et al. | 382/100 |
| 2007/0121939 A1* | 5/2007 | Olesen et al. | 380/201 |
| 2007/0220585 A1* | 9/2007 | Farrugia et al. | 726/1 |
| 2008/0215891 A1* | 9/2008 | Horne et al. | 713/187 |
| 2008/0301452 A1* | 12/2008 | Horne et al. | 713/176 |
| 2009/0136026 A1* | 5/2009 | Celik et al. | 380/42 |
| 2009/0158051 A1* | 6/2009 | Michiels et al. | 713/189 |
| 2009/0313480 A1* | 12/2009 | Michiels et al. | 713/187 |
| 2010/0229002 A1* | 9/2010 | Horne et al. | 713/190 |
| 2010/0268958 A1* | 10/2010 | Horne et al. | 713/176 |

OTHER PUBLICATIONS

"International Application Serial No. PCT/IB2008/053588, Written Opinion of the International Searching Authority", (Apr. 14, 2009), 5 pgs.

Chow, Stanley, et al., "White-Box Cryptography and an AES Implementation", *SAC 2002, Selected Areas in Cryptography*, (Aug. 15, 2002), 250-270.

Lemma, Aweke, et al., "Secure Watermark Embedding Through Partial Encryption", *Digital Watermarking Lecture Notes in Computer Science*, vol. 4283, (Jan. 2006), 433-445.

* cited by examiner

CRYPTOGRAPHIC PROCESSING OF CONTENT

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

PRIORITY CLAIM TO RELATED APPLICATIONS

This application is a national stage application under 35 U.S.C. §371 of PCT/IB2008/053588, filed Sep. 4, 2008, and published as WO 2009/034504 A2 on Mar. 19, 2009, which claims priority to European Application No. 07116285.3, filed Sep. 13, 2007, which applications and publication are incorporated herein by reference and made a part hereof in their entirety, and the benefit of priority is claimed thereto.

FIELD OF THE INVENTION

The invention relates to cryptographic processing of content. The invention also relates to distributing content.

BACKGROUND OF THE INVENTION

Description of Related Art

The past few years have experienced a clear shift from classic content distribution channels, such as CDs or DVDs, towards electronic content distribution (ECD). Even though electronic distribution offers new business possibilities for content providers, the risk of un-authorized mass re-distribution largely limited the widespread adoption of digital distribution channels. Digital Rights Management (DRM) systems try to minimize the risk of copyright infringements by using cryptographic techniques to securely distribute content to client devices and enforce proper usage. Encryption, however, can only offer a partial solution to the problem of unauthorized distribution. Eventually, the content has to be decrypted and presented to the user in (analogue) clear-text form, from which copies can easily be made and re-distributed. Forensic tracking watermarks-which may be used in place of or in conjunction with traditional DRM/encryption methods-allow to enforce usage rights beyond the digital domain. In a forensic tracking system, each copy of the distributed content is watermarked with a unique transaction tag, which links that copy either to a particular user or to a specific device. When an unauthorized copy is found, the embedded watermark (carrying the transaction tag) uniquely identifies the source of the copy, and allows to trace the user who has redistributed the content. Even though forensic tracking in itself does not prevent unauthorized re-distribution, the risk of being caught acts as a strong deterrent.

In conventional forensic tracking systems, forensic watermarks are embedded into the content directly by a trusted distribution server before the content is released onto a distribution network. This model, however, severely limits the applicability of forensic watermarks in forthcoming content distribution models.

Secure watermark embedding allows to securely embed a watermark into a piece of content at an untrusted user device without compromising the security of the watermark key, the watermark, or the original. Secure embedding can be achieved by using traditional watermarking schemes in conjunction with partial encryption techniques, which were primarily developed to facilitate fast encryption of media content.

In "Secure Watermark Embedding Through Partial Encryption", by A. N. Lemma, S. Katzenbeisser, M. U. Celik, M. V. Veen, in Proceedings of International Workshop on Digital Watermarking (IWDW 2006), Springer LNCS, 4283, 433-445, 2006, referred to hereinafter by "Lemma et al.", two secure embedding mechanisms are developed that are based on this concept. One is for the MASK watermarking scheme operating on baseband audio and one is for a spread spectrum watermarking scheme operating on MPEG-2 encoded video streams.

SUMMARY OF THE INVENTION

It would be advantageous to have an improved system for cryptographic processing of content. To better address this concern, in a first aspect of the invention a system is presented that comprises:

an input for receiving the content;

a plurality of look-up tables representing a white-box implementation of a combined cryptographic and watermarking operation, the look-up tables representing processing steps of the combined cryptographic and watermarking operation and the look-up tables being arranged for being applied according to a predetermined look-up scheme, the look-up scheme prescribing that an output of a first look-up table of the plurality of look-up tables be used to generate an input of a second look-up table of the plurality of look-up tables, wherein the combined cryptographic and watermarking operation comprises a cryptographic operation and a watermarking operation; and a control module for looking up values in the plurality of look-up tables in dependence on the received content and in accordance to the look-up scheme, thereby applying the combined cryptographic and watermarking operation to the content to obtain processed content.

Because a watermarking operation and a cryptographic operation are performed in a combined cryptographic and watermarking operation, the result of either one of the watermarking operation and the cryptographic operation does not become available as an intermediate result in the system. This helps to prevent illegal distribution of content that has undergone the cryptographic operation but not the watermarking operation. Also, the combined cryptographic and watermarking operation and the obfuscation of intermediate results help to prevent leaking information about the watermark.

The combined cryptographic and watermarking operation may comprise adding a watermark to the content and/or removing a watermark from the content and/or encrypting the content and/or decrypting the content. For example, encrypted content may be decrypted and have a watermark added to it. In another example, useful for legal distribution of copyrighted content in peer-to-peer networks, watermarked, unencrypted content may have the watermark removed from it and be encrypted. In another example, encrypted content may be decrypted, have a watermark added to it (or removed from it), and be encrypted again as part of the combined cryptographic and watermarking operation. White-box implementations using look-up tables are known from S. Chow, P. Eisen, H. Johnson, P. C. van Oorschot, "White-Box Cryptography and an AES Implementation", Proc. of the 9th Annual Workshop on Selected Areas in Cryptography, 2002.

In an embodiment, the plurality of look-up tables is generated by generating a first plurality of look-up tables representing a white-box implementation of the cryptographic operation; and changing at least one look-up table of the first plurality of look-up tables and/or adding at least one look-up table to the first plurality of look-up tables to incorporate the watermarking operation into the first plurality of look-up tables thereby generating the plurality of look-up tables representing the white-box implementation of the combined cryptographic and watermarking operation.

This is an easy way of generating the look-up tables is by starting with an implementation of a cryptographic operation and adding the watermarking operation to it. In an embodiment, the cryptographic operation comprises a decryption operation. In another embodiment, the watermarking operation comprises an operation to add a watermark to the content. The system is particularly suitable for adding a watermark during a decryption operation.

In an embodiment, the watermarking operation is incorporated in at least one tail table of the plurality of look-up tables. A tail table is one of the last tables involved in the cryptographic operation. This embodiment combines a step of the cryptographic operation and the watermarking operation in a look-up table. The watermarking operation can be most easily incorporated in the plurality of look-up tables by properly adjusting the values in at least one of the tail tables of the plurality of look-up tables.

An embodiment comprises:

a plurality of versions of at least one of the look-up tables in the plurality of look-up tables, and wherein the control module comprises a selector for selecting at least one version of the plurality of versions in dependence on a predetermined index value, wherein the control module is arranged for looking up at least one value in the selected version, and wherein the watermarking operation depends on a contents of the versions.

The index value and the plurality of look-up tables allow for more complex watermark patterns, for example watermark patterns that vary as a function of time. The index value may be controlled by means of a pseudo-random generator (or any other index value generator) in the system, it may be determined in dependence on information encapsulated in the received content, and/or it may be received from an external source. For example the content may be received from a simple file server, whereas the index values are obtained from a digital rights management server application.

An embodiment comprises an input for receiving the index value. Another embodiment comprises an index generator for determining the index value in dependence on the received content.

In an embodiment, a first look-up table for applying at least a first portion of the watermark and a second look-up table for applying at least a second portion of the watermark are merged in a merged table, wherein the merged table comprises the entries of both the first look-up table and the second look-up table. Some kinds of watermarks may leak information through the look-up tables, for example an additive watermark that uses clipping may lose one or more values and have some other values duplicated. By merging a plurality of tables into a merged table, for example one table adding a positive value and one table adding a negative value, this source of leaking information is eliminated.

In an embodiment, the first look-up table comprises a first watermarking operation, and the second look-up table comprises a second watermarking operation, wherein the second watermarking operation substantially involves an inverse operation of the first watermarking operation. This way, leaking information regarding the watermarking operation via the look-up tables is avoided.

In an embodiment, the system comprises a personal computer. The system is especially valuable in software applications, for example on an open software platform such as a personal computer (PC), or a mobile phone or a personal digital assistant (PDA), because the system is relatively secure even in the case where a malicious user has the opportunity to fully control and inspect the execution environment.

An embodiment comprises a watermark generator for providing a plurality of different watermark patterns; and a look-up table generator for providing a plurality of networks of look-up tables, a network of look-up tables of the plurality of networks of look-up tables representing a whitebox implementation of a combined cryptographic and watermarking operation, the look-up tables of the network of lookup tables representing processing steps of the combined cryptographic and watermarking operation and the look-up tables being arranged for being applied according to a predetermined look-up scheme, the look-up scheme prescribing that an output of a first look-up table of the plurality of look-up tables be used to generate an input of a second lookup table of the plurality of look-up tables, wherein the combined cryptographic and watermarking operation comprises a cryptographic operation and a watermarking operation corresponding to at least one of the plurality of different watermark patterns, wherein the watermarking operations of different networks of look-up tables correspond to different ones of the plurality of different watermark patterns.

This system may be used as a server to distribute the white-box implementations to the clients. The result is that different clients get different watermarks, and content processed by the different clients thus is watermarked differently, which allows forensic tracking of the source of any illegally distributed content item. For example the system is implemented in a digital rights management server system that provides digital licenses via a network connection such as the Internet.

An embodiment comprises a first output for distributing the plurality of the networks of look-up tables to a plurality of user clients. Distributing the look-up tables and the control module by the same system, e.g. implemented on a single server system, is efficient and convenient for the user, because he may obtain both from a single place.

In an embodiment, the first output is arranged for distributing to the user clients a control module for looking up values in the network of look-up tables in dependence on the received content and in accordance to the look-up scheme, the control module thereby applying the combined cryptographic and watermarking operation to received content to obtain processed content. This enables the system to control the way the values are being looked up in the network of look-up tables.

In an embodiment, the same content is distributed to multiple of the plurality of the user clients; and the same content is watermarked differently by the multiple of the plurality of the user clients in dependence on the distributed networks of look-up tables. Distributing only a single version of the content is an efficient way of distributing content to a large number of recipients, for example in the application of broadcasting. The watermarking operation ensures that each client watermarks the contents differently.

An embodiment comprises a plurality of look-up tables, wherein the plurality of look-up tables represents a white-box implementation of a combined cryptographic and watermarking operation, the look-up tables representing processing steps of the combined cryptographic and watermarking operation and the look-up tables being arranged for being applied according to a predetermined look-up scheme, the look-up scheme prescribing that an output of a first look-up table of the plurality of look-up tables be used to generate an input of a second look-up table of the plurality of look-up tables, wherein the combined cryptographic and watermarking operation comprises a cryptographic operation and a watermarking operation.

An embodiment comprises a method of cryptographic processing of content, comprising receiving the content;

representing a white-box implementation of a combined cryptographic and watermarking operation, the look-up tables representing processing steps of the combined cryptographic and watermarking operation and the look-up tables being arranged for being applied according to a predetermined look-up scheme, the look-up scheme prescribing that an output of a first look-up table of the plurality of look-up tables be used to generate an input of a second look-up table of the plurality of look-up tables, wherein the combined cryptographic and watermarking operation comprises a cryptographic operation and a watermarking operation; and looking up values in the plurality of look-up tables in dependence on the received content and in accordance to the look-up scheme, thereby applying the combined cryptographic and watermarking operation to the content to obtain processed content.

An embodiment comprises a method of distributing content, comprising:

providing a plurality of different watermark patterns; and providing a plurality of networks of look-up tables, a network of look-up tables of the plurality of networks of look-up tables representing a white-box implementation of a combined cryptographic and watermarking operation, the look-up tables of the network of look-up tables representing processing steps of the combined cryptographic and watermarking operation and the look-up tables being arranged for being applied according to a predetermined look-up scheme, the look-up scheme prescribing that an output of a first look-up table of the plurality of look-up tables be used to generate an input of a second look-up table of the plurality of look-up tables, wherein the combined cryptographic and watermarking operation comprises a cryptographic operation and a watermarking operation corresponding to at least one of the plurality of different watermark patterns, wherein the watermarking operations of different networks of look-up tables correspond to different ones of the plurality of different watermark patterns.

An embodiment comprises a computer program product comprising computer executable instructions for causing a processor to perform any of the methods set forth.

BRIEF DESCRIPTION OF THE DRAWINGS

These and other aspects of the invention will be further elucidated and described with reference to the drawing, in which.

DETAILED DESCRIPTION OF EMBODIMENTS

Figure 1:
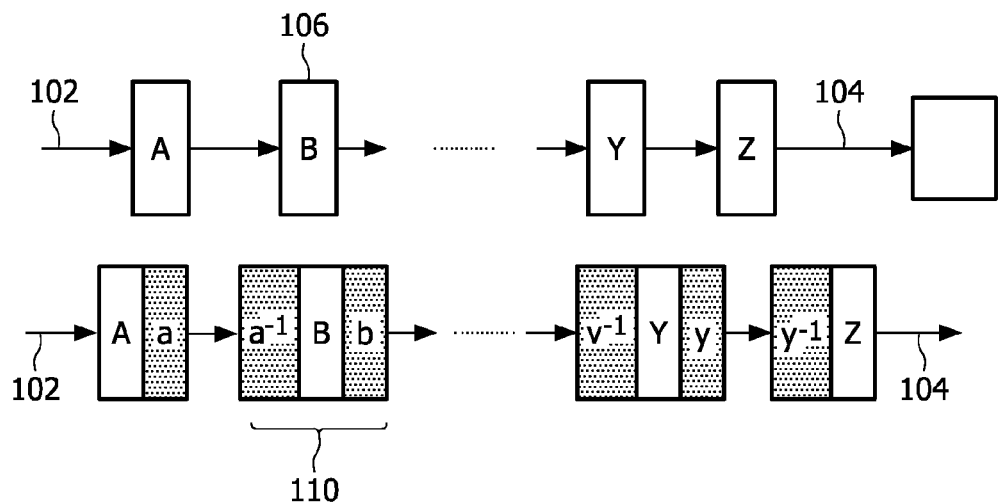
FIG. 1 illustrates two networks of look-up tables.

In the Figures, like objects have been labeled with like reference numerals.

Conventional whitebox cipher techniques implement a cipher with a fixed decryption key using a series of table lookups. The freedom in the choice of the tables makes it possible to derive multiple unique whitebox implementations for the same decryption key. Thus, the whitebox implementation allows for tracking of the individual decryption software copies, against redistribution attacks. Some of the deficiencies of these systems when applied in DRM systems are as follows: (i) An attacker can further obfuscate the whitebox implementation such that the tables cannot be observed. As a result, he may obtain an untraceable but fully functioning decryption software. (ii) Each copy of the decryption software gives the same output. If the attacker publishes the decrypted content, instead of the decryption software, he cannot be traced.

In this text, techniques are disclosed that combine watermarking and whitebox symmetric cipher implementations. These techniques allow to overcome some of the problems associated with current whitebox implementations, especially in the scope of DRM systems. Moreover, the proposed techniques may solve some of the security problems which arise when forensic tracking watermarks are embedded at the client-side in an unprotected environment.

White-box cryptography is about implementing a cryptographic cipher in software such that the key cannot be extracted in the 'white-box attack model'. This is the strongest conceivable attack model in which the attacker has full access to the software and full control over the execution environment. In white-box implementations the key is hidden in lookup tables. In other words, lookup tables take over the role of the cryptographic key, which makes it impossible for an attacker to extract the original cryptographic key. An example of a whitebox symmetric cipher implementation is described in S. Chow, P. Eisen, H. Johnson, P. C. van Oorschot, "White-Box Cryptography and an AES Implementation", Proc. of the 9th Annual Workshop on Selected Areas in Cryptography, 2002.

FIG. 1 illustrates some aspects of the whitebox implementation principle. All operations in the decryption are implemented as a series of table lookups 106 (top of FIG. 1). The arrows indicate flow of information between look-up tables 106. The received content defines the input 102 of the first look-up table, and the output 104 of the last look-up table defines the decrypted content. As shown in the bottom half of FIG. 1, each table 110, defining a transformation B, can be pre and post transformed with random bijections, e.g. $a^{-1}$ and $b$, to obtain a table 110 that performs the transformation $b \circ B \circ a^{-1}$. As long as each post transformation (e.g. $b$) is undone by the next pre transformation (e.g. $b^{-1}$), the effect of any given set of transformations A, B, etc. can be obtained with arbitrary choice of transformations a, b, etc., and the intermediate results are all differently encoded according to the transformations a, b, etc.

Block ciphers operate on blocks of a predetermined size. The blocks are usually decrypted one by one. For instance, AES operates on blocks of 128 bits. It is usually not practical to have lookup tables that operate on a complete block of, in the example of AES, 128 bits, because the size of the look-up table would become too large (in the example of AES such a table would have $2^{128}$ entries). Whitebox implementations divide these blocks into sub-blocks of nibbles (4 bits), bytes (8 bits) or words (16 bits). Operations (e.g. XOR) on each sub-block are implemented as table lookups. There are 16 entries for a nibble table, 256 entries for a byte table and 65536 entries in a word table. The outputs of the tables may be divided into portions which become an input for the next look-up tables (for example a 16-bit output is divided into 4 nibbles, each nibble is provided as input to a different look-up table). Moreover, the input to the tables may be composed of bits that are outputs of a plurality of other tables. Accordingly, the illustration in the bottom half of FIG. 1 only illustrates a simplified look-up table configuration. In a real implementation the look-up tables often form a network of look-up tables having a complex network topology.

In a forensic tracking DRM architecture, each piece of content exchanged between a service provider (or content owner) and a customer may be watermarked with the identity of the customer. Due to the complexity of the watermarking process, it may be preferable to embed forensic tracking watermarks at the client-side to limit bandwidth usage and server complexity. Embedding in these untrusted clients, however, requires secure embedding methods that do not leak unmarked contents or the watermarking secrets. To solve this issue, "secure watermark embedding schemes" were proposed, which combine encryption and watermark insertion in one step, so that neither the original nor the watermark (secrets) are exposed to the untrusted client. Such secure embedding schemes are discussed in, for example, the aforementioned article by Lemma et al.

Current whitebox implementations help preventing extraction of symmetric keys from the software and help tracking of individual decryption software copies when they are published verbatim. For example, the tracking may be realized by choosing different encoding transformations a, b, etc. for each user. A user who has illegally distributed a copy of his version of the software may then be traced by inspecting the values in the look-up tables. However, these methods may have the following shortcomings:

First, the whitebox implementation can be further obfuscated by a malicious user. The so changed version may have the same decryption functionality, but it may not be possible to trace the source of the malicious user who distributed the changed version. One possibility for a malicious user may be to change the look-up table according to additional output encoding/input decoding pairs ($\alpha$ and $\alpha^{-1}$).

Second, in DRM systems, each individual copy outputs the same content. If the attacker publishes the decrypted content, instead of the decryption software, he cannot be traced.

Current secure watermark embedding methods may have the shortcoming that the size of the decryption key becomes proportional to the content size. They often require very large decryption keys (in the order of the content size) for good security.

Unlike most other kinds of data, audiovisual content can be modified slightly without introducing any perceptible artifacts. Therefore, each whitebox implementation, for the same decryption key, may be arranged to output a slightly modified content copy. These slight modifications, also known as watermarks or fingerprints, may be used to trace decrypted content or the whitebox implementation that created the decrypted content.

Figure 2:
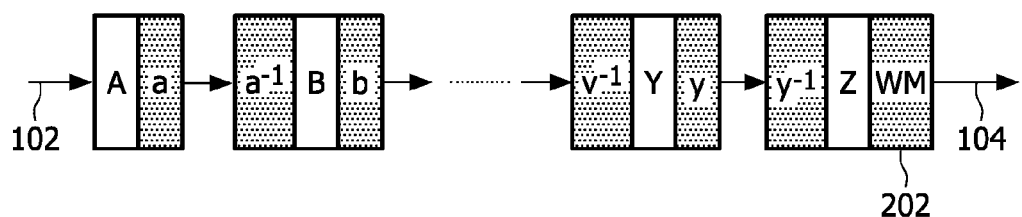
FIG. 2 illustrates a network of look-up tables.

FIG. 2 illustrates an embodiment in which a watermark transformation 202 is included in the last look-up table of the decryption process. This transformation modifies a data sub-block, e.g. a byte, of a data block to embed a watermark. As the transformation 202 is merged with the last (tail) table of the decryption process, decryption and watermarking functions cannot be separated easily. In this system (see FIG. 2), for each individual software copy, different transformations are used for y and WM. This way, the tables $y \circ Y \circ v^{-1}$ and $WM \circ Z \circ y^{-1}$ are different in each individual software copy. The arbitrary choice of y (thus, $y^{-1}$) prevents the attacker from removing or exchanging the watermark tables. The WM operations preferably change the decrypted values only slightly, e.g. change the value by ±1 for instance by flipping the least significant bit. The table $WM \circ Z \circ y^{-1}$ may comprise a transformation Z, which performs a step (for example the last step) of the decryption process. This way, the decryption and the watermarking operations are tightly coupled to each other.

When the whitebox implementation is redistributed and found, the watermark table WM used in this implementation may be detected by querying the implementation. In particular, different cipher-texts $c(\Sigma)$ are processed by the implementation, and the output $\Omega$ is analyzed. The differences between $\Sigma$ and $\Omega$ are used to reconstruct the watermark table WM, thus to identify the source of the copy. Hereinafter, this scenario is called "detection with chosen content".

In the example of a white-box implementation based on a 128-bit block cipher, assuming each entry in all tail tables can be altered by one bit to form the watermark, there may be 16 tables×256 entries=4096 or 8 tables×65536 entries=500000 bits that may be selected differently in each watermark, depending on whether in the last stage of the whitebox implementations look-up tables with bytes or words are used, respectively. There is enough space to uniquely identify millions of users in either case.

The technique allows to trace illegally distributed copies of the white-box implementation, even when an attacker further obfuscates the implementation. Instead of inspecting the look-up tables directly to determine the watermark, the input-output behavior of the decryption software is analyzed. This behavior is unique for each unique set of watermark transformations WM. Therefore, any further obfuscation (e.g. by changing of the encodings a, b, c, etc.) does not affect the identification.

Figure 3:
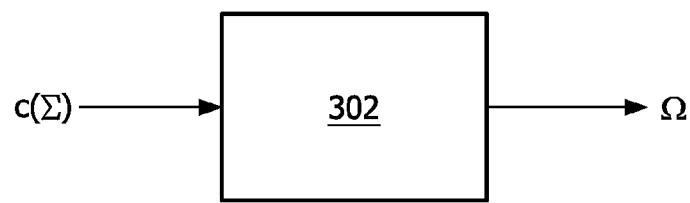
FIG. 3 illustrates a white-box implementation.

FIG. 3 illustrates a scenario in which content is traced. Given the watermarked content $\Omega$ and optionally the original ciphertext $c(\Sigma)$, the task is to find the whitebox implementation 302 that produces the particular watermark present in $\Omega$. The property may be used that $\Sigma \neq \Omega$ and that $\Omega$ is different for different whitebox implementations. It is possible to trace the watermarked content, for example in the case that the decrypted content $\Omega$ is published and preferably the corresponding original $\Sigma$ is known. In this case, the detection may be harder as $\Sigma$ may not be selected arbitrarily, but depends on an already published content $\Omega$. Nonetheless, if enough material with sufficient variation is observed, it is possible to reconstruct (at least part of) the watermark tables WM. Hereinafter, this scenario is called "detection with known content".

In the scenarios described above, it was assumed that both the input-output behavior of the software and the decrypted content are not altered by a malicious user. Under a more relaxed assumption, the attacker may modify the tail tables or the content values in a manner similar to our approach, for instance by altering least significant bits. This may make the tracing more difficult, and in some scenario's the tracing cannot be performed reliably.

In the following paragraphs, the case is handled in which an attacker has made functional changes to the white-box implementation. Such changes influence the global input-output behavior of the white-box implementation and thus may hide the watermark.

A common method to enable robustness against random changes by an attacker is to spread the payload information to multiple positions—also known as spread-spectrum methods. In a typical spread-spectrum watermark, each unique copy is assigned a relatively long (e.g. 1000-10000 entries) sequence with $\{-1,+1\}$ entries. Other values instead of $-1$ and $+1$ may also be used. This sequence is embedded into the content, by adding the consecutive entries in this sequence to consecutive samples of the content. For instance, first pixel is increased by one, second pixel is decreased by one, etc. In essence, the embedded watermark symbols are position dependent. Detection is performed by correlating this sequence with the content. If the sequence is long enough, there will be a clear high correlation value. As the content or any random changes introduced by an attacker, who does not know the embedded sequence, will be uncorrelated, their effect on the correlation value will be limited. In short, this method allows us to embed robust watermarks, which can be detected even in the presence of noise.

A typical AES whitebox implementation has 8 or 16 different sub-blocks of bytes or words, respectively. Each sub-block has an associated watermark transformation. Each lookup table can be altered to add a $\{-1,+1\}$ watermark symbol. For instance, 0 maps to 1, 1 maps to 2, . . . , 254 maps to 255 and 255 maps to 255. Some possible security consequences of the clipping will be discussed hereinafter. Unfortunately, 8-16 different tables may not be sufficient to accommodate long watermark sequences as mentioned above.

Figure 4:
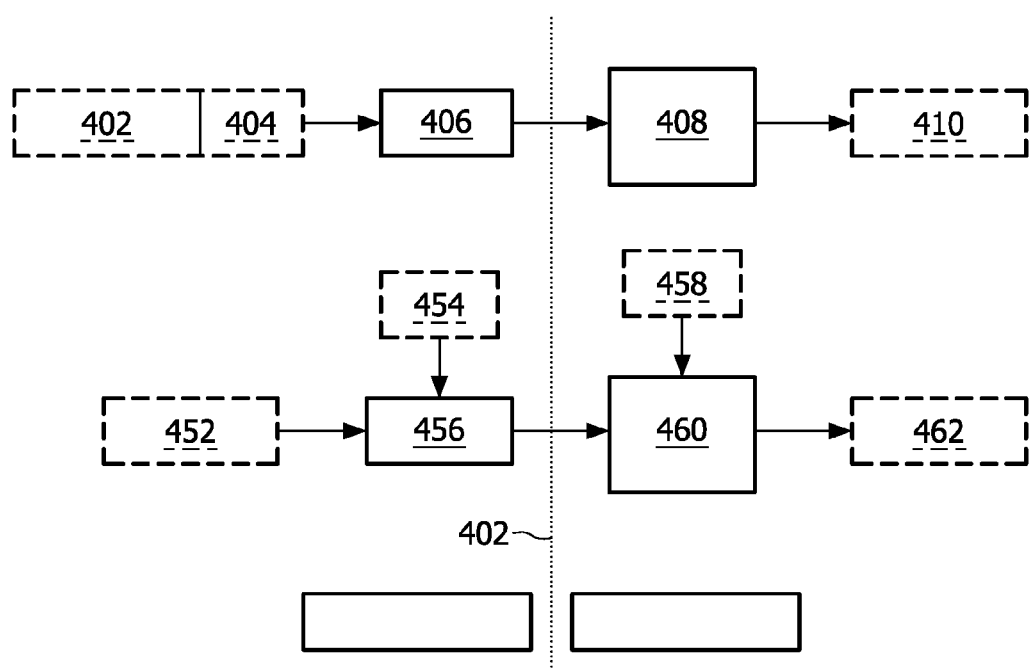
FIG. 4 illustrates an embodiment.

FIG. 4 illustrates two embodiments (in the top half and bottom half of the Figure, respectively) in which one or more tail tables in the whitebox implementation are duplicated and different watermark transformations are applied to each replica (to make them different). In order to dynamically select which of these different tail/watermark tables to use, an index value is used. In FIG. 4, two options for including an index are illustrated. In the first option illustrated in the top half of FIG. 4, a plaintext block comprising a data field 402 and index field 404 is shown. The plaintext block 402,404 is encrypted by encryptor 406. The resulting ciphertext is provided to whitebox decryption unit 408 which generates the watermarked plaintext 410. Some bits 404 in the plain-text block 402,404 are reserved for the index value(s). These bits 404 are used in the whitebox implementation to steer the data 402 toward a particular tail/watermark table. The advantage of this option is the fact that the attacker does not have access to the index information. On the other hand, extra bits 404 need to be transmitted with the data block 402. There is a transmission and storage overhead. In the second option shown in the bottom half of FIG. 4, a data block 452 and index value(s) 454 are shown as separate inputs to encryptor 456. Index value(s) 454 are optional. The resulting ciphertext is provided to whitebox decryption unit 460 as well as a sequence of index values k 458 in a separate input to the whitebox decryption unit. The watermarked plaintext 462 depends on the ciphertext and the index values k. The index is an additional input 454, 458 to the encryption and the whitebox decryption software. This index explicitly tells the software which of the duplicate tail/watermark tables to use. If the attacker alters the index, the decryption may fail. The use of correct index is somewhat ensured by making the encryption also dependent on this index. The transmission overhead is eliminated. However, the attacker might find out where the watermark symbols are inserted. Note that the index may be a simple counter in mod N if there are N replicas for a watermark that repeats after N samples. In such a case, only the start of the sequence needs to be signaled once.

Note that for different decryption software copies, the watermark sequences (hence the symbols assigned to the different tail tables) are different. Each sequence is unique and identifies a particular software copy. Therefore, even if the same index value sequence is used on all copies, the content is watermarked differently.

Position dependent watermarks may be detected. The spread-spectrum watermark embedded with the help of the index information may be quite robust. Even if the attacker alters the tail tables to add changes of his own, these changes will be uncorrelated with the watermark sequence unknown to the attacker. Moreover, the decryption software used for decrypting a content may be identified from the decrypted content even if the original content is not known or even if the decrypted content is further altered by adding noise or compressing it with loss (e.g. MPEG/JPEG compression). Detection can be performed in various ways, for instance using a correlation detector.

Figure 6:
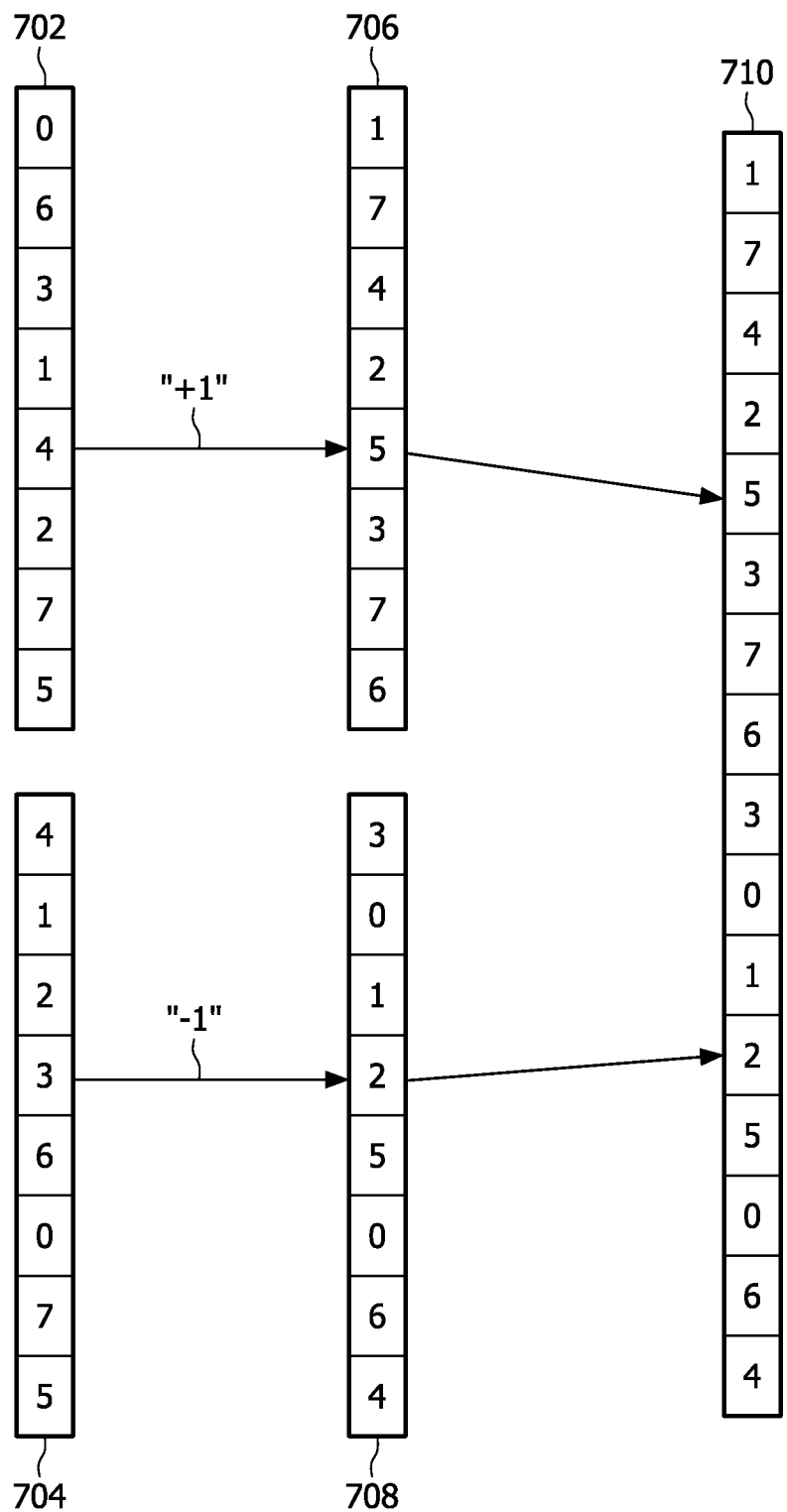
FIG. 6 illustrates merging a look-up table.

The +1 tables and $-1$ tables may be merged for better security. Above, it was assumed that a watermark symbol of $\{-1,+1\}$ can be embedded by appending a watermark lookup transformation to the tail table. While bijective transformations (e.g. modular addition) can be safely implemented in this manner, regular additions with clipping (e.g. both 254 and 255 map to 255) are vulnerable to histogram analysis attacks. In particular, the attacker may look at the distribution of entries in the tail table. If he sees no 0 entry and two 255 entries, he may conclude that the corresponding watermarking symbol is a +1 This is illustrated in tables 702 and 706 of FIG. 6. Similar analysis is true for $-1$, where two 0 entries and no 255 entry are present. This is illustrated in tables 704 and 708. To overcome this, two tail tables, one with a +1 watermark symbol and one with a $-1$ watermark symbol are merged into one long table 710 to make the distribution of the merged table uniform. Because the first table has two 255 entries and the second table has two 0 entries, all entries now appear two times in such a merged table. In FIG. 6, the two tables 706 and 708 are simply concatenated to form merged table 710; however, given this description, more sophisticated ways of merging the two tables, including for example interlacing entries of table 706 and 708 in the merged table 710, are within reach of the skilled person.

It is possible to apply partial encryption and decryption. In DRM applications, it is often sufficient to encrypt/watermark only the significant parts of the audiovisual content, for instance low frequency DCT coefficients. This concept was explored in the context of secure watermark embedding in the aforementioned article by Lemma et al. A similar approach may be taken in the context of client-side watermarking in whitebox decryption implementations by using the whitebox decryption function only on significant parts of the content to speed-up the decryption process. Partitioning the signal into significant and insignificant parts also allows to utilize compression on the insignificant parts. In such a case, the parts processed by the whitebox implementation may be in baseband, while the rest may be compressed and encrypted/decrypted with a standard cipher.

An embodiment comprises two instantiations of a product which (i) are both based on table lookups and (ii) the tables differ only in the last stage.

Figure 5:
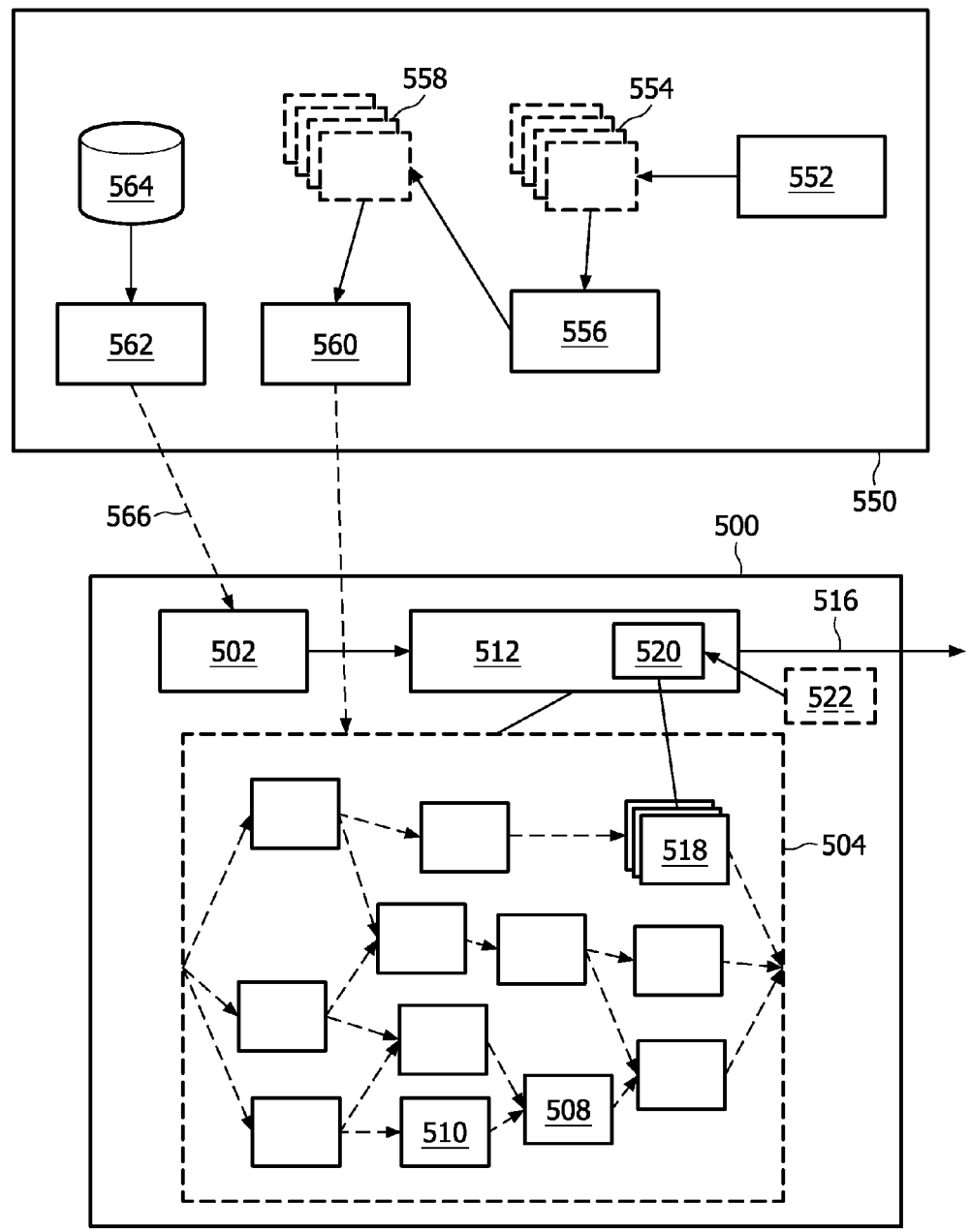
FIG. 5 illustrates an embodiment.

FIG. 5 illustrates an embodiment. In this Figure, solid boxes indicate system components, dashed boxes indicate data stored in the system. The Figure illustrates a system 500 for cryptographic processing of content and a system 550 for distributing content. The system 500 may be implemented in a client system, for example a personal computer, a set-top box, a television or a media player (e.g. DVD player or mp3 player). The system 550 may be implemented as a server system, for example an internet server, an online content store such as a music store, a digital rights management server, a digital video broadcast (DVB) system.

The system 550 is capable of distributing content 564. The content 564 is distributed via an output 562, which may comprise a CD or DVD mastering application or an internet connection or a DVB (e.g. DVB-T, DVB-S, DVB-H) broadcasting connection, indicated by a dashed arrow 566. The system 550 comprises a watermark generator 552 for providing a plurality of different watermark patterns 554. The watermark pattern may include a pattern of changes to be made to the content. Typically, audio/visual content is changed slightly, for example by adding or subtracting a very small value from the values as they appear in the original content, as set forth above.

The system 550 also comprises a look-up table generator 556 for providing a plurality of networks of look-up tables 558. Each of the networks of look-up tables may be distributed to one of the clients 500 in the network. The distributed network of look-up tables 504 distributed to a client system 500 is stored therein to be used for processing of content data. A network of look-up tables generated by the look-up table generator represents a white-box implementation of a combined cryptographic and watermarking operation 460, an input of a first look-up table of the plurality of look-up tables depending on an output of a second look-up table of the plurality of look-up tables, the second look-up table being arranged for encoding and thereby obfuscating the output, the first look-up table being arranged for decoding the output, wherein the watermarking operations represented by different ones of the plurality of networks of look-up tables correspond to different ones of the plurality of watermark patterns. In an embodiment, a step of the decryption operation and a step of the watermarking operation are combined in at least one of the look-up tables. For example, the last step of the decryption operation may be combined with a step of the watermarking operation in one of the look-up tables.

The system 550 comprises a first output 560 for distributing the plurality of the networks of look-up tables to a plurality of user clients 500. The first output 560 may also be used to distribute to the user clients 500 a control module 512 for looking up values in the plurality of look-up tables in dependence on the received content and in accordance to a predetermined look-up scheme to apply the combined cryptographic and watermarking operation to the content to obtain processed content. A simplified example of the predetermined look-up scheme is illustrated by means of the dashed arrows in the network of look-up tables 504. The dashed arrows indicate that at least part of the output of a look-up table forms at least part of an input to at least one of the other look-up tables in the network. For example, a first subset of output bits of a first look-up table may be at least part of an input to a second look-up table, and a second subset of the output bits of the first look-up table may be at least part of an input to a third look-up table. The second and third look-up table may also receive some input bits from some other look-up table(s). This look-up scheme is applied by the control module 512.

The content 564, for example a live television show or a movie stored in an online movie database, is distributed via output 562 to the client systems 500. The same content is distributed to multiple of the plurality of the user clients, and the same content is watermarked differently by the multiple of the plurality of the user clients in dependence on the distributed networks of look-up tables.

The system 500 is used for the cryptographic processing of the content. It comprises an input 502 for receiving the content 566. A plurality of look-up tables 504 are stored in the system 500 representing a white-box implementation of a combined cryptographic and watermarking operation 460. An input of a first look-up table 508 of the plurality of look-up tables depending on an output of a second look-up table 510 of the plurality of look-up tables, the second look-up table being arranged for encoding and thereby obfuscating the output, the first look-up table being arranged for decoding the output. The plurality of look-up tables may be organized in a network of look-up tables. The system 500 comprises a control module 512 for looking up values in the plurality of look-up tables in dependence on the received content and in accordance to a predetermined look-up scheme to apply the combined cryptographic and watermarking operation to the content to obtain processed content 516. In the illustrated embodiment, the combined cryptographic and watermarking operation comprises a decryption operation, and an operation to add a watermark to the content. Alternatively or additionally, the combined cryptographic and watermarking operation may comprise an encryption operation and/or an operation to remove a watermark from the content. At least one of the encryption operation or the decryption operation and at least one of the watermark addition operation or the watermark removal operation are present in the combined cryptographic and watermarking operation.

Preferably the watermarking operation is incorporated in at least one tail table of the plurality of look-up tables. This is the most easy to realize, because the effect of a change to the tail table to the end result is relatively straightforward to determine.

The plurality of look-up tables may comprise a plurality of versions 518 of at least one of the tables in the network of look-up tables. In this case, the control module comprises a selector 520 for selecting at least one version of the plurality of versions in dependence on a predetermined index value 522, wherein the control module is arranged for looking up at least one value in the selected version of the plurality of versions 518. The index 522 may be generated by an index generator. The index 522 may be also be generated by and received from the system 550.

Of the plurality of look-up tables 504, in particular the look-up tables implementing the watermarking operation, a first look-up table 706 applying at least a portion of the watermark and a second look-up table 708 applying at least a portion of the watermark are merged in a merged table 710. The merged table comprises the entries of the at least two tables. At least one of the at least two tables 706 comprises a watermarking operation substantially involving an addition of a positive number, and at least one of the at least two tables 708 comprises a watermarking operation substantially involving an addition of a negative number. Alternatively, instead of addition of a positive or negative number, respectively, it is possible to apply a multiplication with a number smaller than one or larger than one, respectively. Preferably, the two operations are each other's inverse operations.

The system 500 is implemented in a personal computer software application, a mobile phone, smartphone, PDA, set-top box, digital video recorder or playback device, or any other device.

An embodiment comprises a method of cryptographic processing of content, comprising receiving the content; representing a combined cryptographic and watermarking operation by means of a plurality of look-up tables; and looking up values in the plurality of look-up tables in dependence on the received content and in accordance to a predetermined look-up scheme to obtain watermarked and cryptographically processed content.

Figure 7:
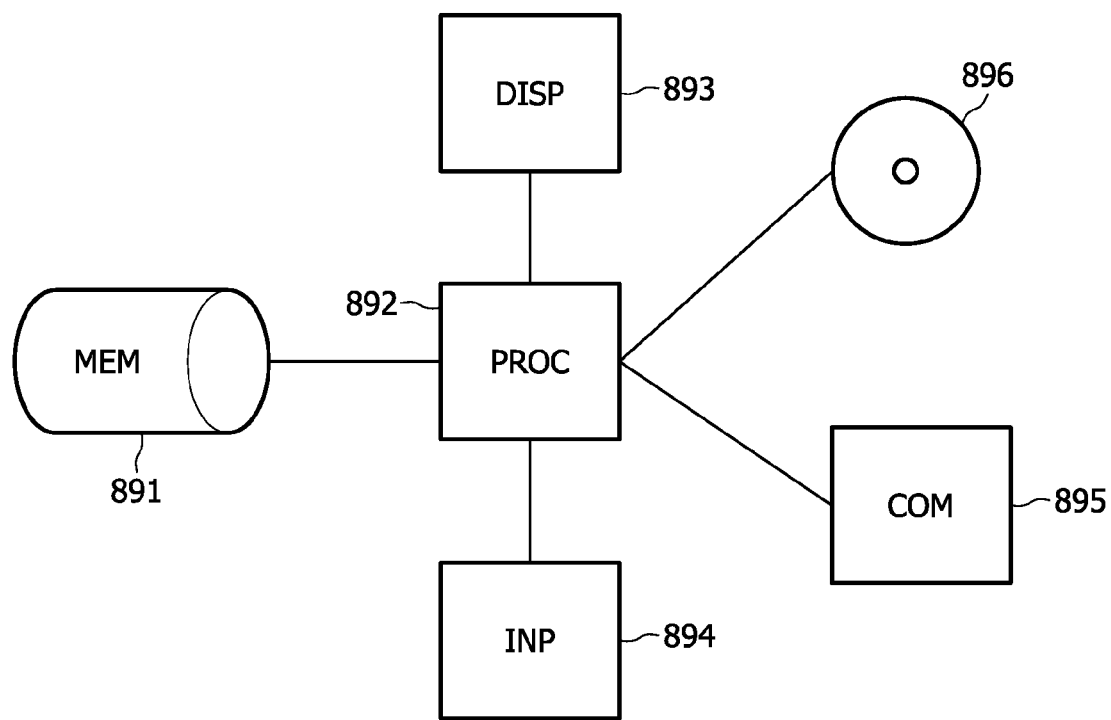
FIG. 7 illustrates an embodiment.

FIG. 7 illustrates hardware components suitable for implementing either system 500 or system 550 or both. The Figure shows a communication port 895 such as a network connection, e.g. a connection to the Internet, a removable storage medium reader/writer 896 (e.g. a CD or DVD player and optionally a recorder, or a flash memory), a display 893 for rendering content and/or for providing control information to a user, a memory 891 for storing computer software and for storing miscellaneous data, an input 894 for receiving input commands from a user, and a processor 892 for controlling the several hardware components and for processing content. The memory 891 may comprise, for example, a RAM memory, a firmware memory, and/or a hard disc storage medium. The memory 891 may comprise computer instructions for causing the system to perform any method set forth herein. The communications port 895 may be used to communicate for example look-up table entries, control modules, encrypted content, and/or index values. Some portions or all of such data may alternatively be communicated via the removable storage medium 896. The decrypted, watermarked content may be rendered using the display 893. For example data transmission, encryption, decryption, and/or playback may be controlled by a user via input 894. Such input may comprise a remote control device, a keyboard, and/or a pointing device.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for cryptographic processing of content, comprising:
   means for receiving the content;
   means for providing a plurality of look-up tables representing a white-box implementation of a combined cryptographic and watermarking operation, the look-up tables representing processing steps of the combined cryptographic and watermarking operation and the plurality of look-up tables being arranged for being applied according to a predetermined look-up scheme, the predetermined look-up scheme prescribing that an output of a first look-up table of the plurality of look-up tables be used to generate an input of a second look-up table of the plurality of look-up tables, wherein the combined cryptographic and watermarking operation comprises a cryptographic operation and a watermarking operation; and
   a means for looking up values in the plurality of look-up tables in dependence on the content received and in accordance to the predetermined look-up scheme, thereby applying the combined cryptographic and watermarking operation to the content to obtain processed content,
   wherein the watermarking operation is incorporated in at least one tail table of the plurality of look-up tables, the at least one tail table being a last table involved in the cryptographic operation.

2. The system according to claim 1, wherein the plurality of look-up tables has been generated by generating a first plurality of look-up tables representing a white-box implementation of the cryptographic operation; and changing at least one look-up table of the first plurality of look-up tables and/or adding at least one look-up table to the first plurality of look-up tables to incorporate the watermarking operation into the first plurality of look-up tables thereby generating the plurality of look-up tables representing the white-box implementation of the combined cryptographic and watermarking operation.

3. The system according to claim 1, wherein the cryptographic operation comprises a decryption operation.

4. The system according to claim 1, wherein the watermarking operation comprises an operation to add a watermark to the content.

5. The system according to claim 1, further comprising:
a plurality of versions of at least one of the look-up tables in the plurality of look-up tables, and wherein the control module comprises a selector for selecting at least one version of the plurality of versions in dependence on an index value,
wherein the control module is arranged for looking up at least one value in the selected version, and
wherein the watermarking operation depends on contents of the versions.

6. The system according to claim 5, further comprising an input for receiving the index value.

7. The system according to claim 5, further comprising an index generator for determining the index value in dependence on the received content.

8. The system according to claim 1, wherein a first look-up table for applying at least a first portion of a watermark and a second look-up table for applying at least a second portion of the watermark are merged in a merged table, wherein the merged table comprises entries of both the first look-up table and the second look-up table.

9. The system according to claim 8, wherein the first look-up table comprises a first watermarking operation, and the second look-up table comprises a second watermarking operation, wherein the second watermarking operation substantially involves an inverse operation of the first watermarking operation.

10. The system according to claim 8, wherein the first look-up table comprises a first watermarking operation substantially involving an addition of a positive number, and the second look-up table comprises a second watermarking operation involving an addition of a negative number.

11. The system according to claim 1, wherein the system comprises a personal computer.

12. The system according to claim 1, wherein the plurality of look-up tables has been generated by generating a first plurality of look-up tables representing a white-box implementation of the cryptographic operation; and changing at least one look-up table of the first plurality of look-up tables thereby generating the plurality of look-up tables representing the white-box implementation of the combined cryptographic and watermarking operation.

13. The system according to claim 1, wherein the plurality of look-up tables has been generated by generating a first plurality of look-up tables representing a white-box implementation of the cryptographic operation; and adding at least one look-up table to the first plurality of look-up tables to incorporate the watermarking operation into the first plurality of look-up tables thereby generating the plurality of look-up tables representing the white-box implementation of the combined cryptographic and watermarking operation.

14. A system for distributing content, comprising:
a processor configured to implement:
a watermark generator for providing a plurality of different watermark patterns; and
a look-up table generator for providing a plurality of networks of look-up tables, a network of look-up tables of the plurality of networks of look-up tables representing a white-box implementation of a combined cryptographic and watermarking operation, the look-up tables of the network of look-up tables representing processing steps of the combined cryptographic and watermarking operation and the look-up tables being arranged for being applied according to a predetermined look-up scheme, the predetermined look-up scheme prescribing that an output of a first look-up table of the network of look-up tables be used to generate an input of a second look-up table of the network of look-up tables, wherein the combined cryptographic and watermarking operation comprises a cryptographic operation and a watermarking operation corresponding to at least one of the plurality of different watermark patterns, wherein the watermarking operations of different networks of look-up tables correspond to different ones of the plurality of different watermark patterns
the watermarking operation being incorporated in at least one tail table of the corresponding network of look-up tables, the at least one tail table being a last table involved in the cryptographic operation.

15. The system according to claim 14, further comprising a first output for distributing the plurality of the networks of look-up tables to a plurality of user clients.

16. The system according to claim 15, wherein the first output is arranged for distributing to the plurality of user clients a control module for looking up values in the network of look-up tables in dependence on content received and in accordance to the predetermined look-up scheme, the control module thereby applying the combined cryptographic and watermarking operation to content received to obtain processed content.

17. The system according to claim 15, further comprising:
a second output for distributing content to the plurality of user clients, wherein the content is arranged for having applied to it the combined cryptographic and watermarking operation.

18. The system according to claim 17, wherein a same content is distributed to multiple of the plurality of the user clients; and the same content is watermarked differently by the multiple of the plurality of the user clients in dependence on the distributed networks of look-up tables distributed.

19. A method executed in a process for cryptographic processing of content, comprising:
receiving the content;
providing a plurality of look-up tables representing a white-box implementation of a combined cryptographic and watermarking operation, the plurality of look-up tables representing processing steps of the combined cryptographic and watermarking operation and the plurality of look-up tables being arranged for being applied according to a predetermined look-up scheme, the predetermined look-up scheme prescribing that an output of a first look-up table of the plurality of look-up tables be used to generate an input of a second look-up table of the plurality of look-up tables, wherein the combined cryptographic and watermarking operation comprises a cryptographic operation and a watermarking operation, wherein the watermarking operation is incorporated in at least one tail table of the plurality of look-up tables, the at least one tail table being a last table involved in the cryptographic operation; and looking up values in the plurality of look-up tables in dependence on the content received and in accordance to the predetermined look-up scheme, thereby applying the combined cryptographic and watermarking operation to the content to obtain processed content.

20. A non-transitory computer-readable medium computer having stored thereon computer executable instructions for causing a processor to perform the method according to claim 19.

21. The method according to claim 19, comprising:

merging a first look-up table and a second look-up table, the first look-up table comprising a first watermarking operation substantially involving an addition of a positive number, the second look-up table comprising a second watermarking operation involving an addition of a negative number.

22. A method executed in a processor for distribution of content, comprising:

providing a plurality of different watermark patterns; and providing a plurality of networks of look-up tables, a network of look-up tables of the plurality of networks of look-up tables representing a white-box implementation of a combined cryptographic and watermarking operation, the look-up tables of the network of look-up tables representing processing steps of the combined cryptographic and watermarking operation and the look-up tables being arranged for being applied according to a predetermined look-up scheme, the predetermined look-up scheme prescribing that an output of a first look-up table of the network of look-up tables be used to generate an input of a second look-up table of the network of look-up tables, wherein the combined cryptographic and watermarking operation comprises a cryptographic operation and a watermarking operation corresponding to at least one of the plurality of different watermark patterns, wherein the watermarking operations of different networks of look-up tables correspond to different ones of the plurality of different watermark patterns, the watermarking operation being incorporated in at least one tail table of the corresponding network of look-up tables, the at least one tail table being a last table involved in th cryptographic operation.

\* \* \* \* \*